United States Patent
Swarts et al.

(10) Patent No.: US 8,135,096 B2
(45) Date of Patent: Mar. 13, 2012

(54) METHOD AND SYSTEM FOR THE EXTENSION OF FREQUENCY OFFSET ESTIMATION RANGE BASED ON CORRELATION OF COMPLEX SEQUENCES

(75) Inventors: Francis Swarts, San Diego, CA (US); Mark Kent, Vista, CA (US)

(73) Assignee: Broadcom Corporation, Irvine, CA (US)

(*) Notice: Subject to any disclaimer, the term of this patent is extended or adjusted under 35 U.S.C. 154(b) by 667 days.

(21) Appl. No.: 12/251,752

(22) Filed: Oct. 15, 2008

(65) Prior Publication Data
US 2009/0232051 A1    Sep. 17, 2009

Related U.S. Application Data

(60) Provisional application No. 61/035,859, filed on Mar. 12, 2008, provisional application No. 61/092,936, filed on Aug. 29, 2008.

(51) Int. Cl.
*H03D 1/00* (2006.01)
(52) U.S. Cl. ......... 375/343; 375/226; 375/316; 375/371
(58) Field of Classification Search .......... 375/343, 375/226, 316, 371
See application file for complete search history.

(56) References Cited

U.S. PATENT DOCUMENTS

| 5,579,338 | A  | * | 11/1996 | Kojima | 375/149 |
| 7,539,241 | B1 | * | 5/2009 | Dick | 375/152 |
| 2005/0002442 | A1 | * | 1/2005 | Litwin et al. | 375/142 |
| 2006/0161403 | A1 | * | 7/2006 | Jiang et al. | 703/2 |
| 2006/0233225 | A1 | * | 10/2006 | Omoto | 375/149 |

OTHER PUBLICATIONS

European Search Report for European Patent Application No. 09010740.0-2411, dated Dec. 14, 2009.

* cited by examiner

*Primary Examiner* — Chieh M Fan
*Assistant Examiner* — Leila Malek
(74) *Attorney, Agent, or Firm* — Sterne, Kessler, Goldstein & Fox PLLC

(57) ABSTRACT

Aspects of a method and system for the extension of frequency offset estimation range based on correlation of complex sequences may include partitioning each of a received sample sequence and a local replica sample sequence into three or more similar length contiguous sample sub-sequences. For each of the three or more similar length contiguous sample sub-sequences, a correlation coefficient may be determined between corresponding sample sub-sequences of the partitioned received sample sequence and the local replica sample sequence. A plurality of phase differences may be determined based on adjacent ones of the determined correlation coefficients, and the determined plurality of phase differences may be averaged to generate a phase increment estimate. The communication system may be compliant with a wireless standard, comprising UMTS EUTRA (LTE), WiMAX (IEEE 802.16), and/or WLAN (IEEE 802.11).

20 Claims, 4 Drawing Sheets

METHOD AND SYSTEM FOR THE EXTENSION OF FREQUENCY OFFSET ESTIMATION RANGE BASED ON CORRELATION OF COMPLEX SEQUENCES

CROSS-REFERENCE TO RELATED APPLICATIONS/INCORPORATION BY REFERENCE

This application makes reference to, claims priority to, and claims the benefit of U.S. Provisional Application Ser. No. 61/035,859, filed on Mar. 12, 2008 and U.S. Application Ser. No. 61/092,936, filed on Aug. 29, 2008.

The above referenced applications are hereby incorporated herein by reference in their entirety.

FIELD OF THE INVENTION

Certain embodiments of the invention relate to wireless communication systems. More specifically, certain embodiments of the invention relate to a method and system for the extension of frequency offset estimation range based on correlation of complex sequences.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third (3G) and fourth generation (4G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink capacity.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for the extension of frequency offset estimation range based on correlation of complex sequences, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for the extension of frequency offset estimation range based on correlation of complex sequences. Aspects of a method and system for the extension of frequency offset estimation range based on correlation of complex sequences may comprise partitioning each of a received sample sequence and a local replica sample sequence into three or more similar length contiguous sample sub-sequences. For each of the three or more similar length contiguous sample sub-sequences, a correlation coefficient may be determined between corresponding sample sub-sequences of the partitioned received sample sequence and the local replica sample sequence. A plurality of phase differences may be determined based on adjacent ones of the determined correlation coefficients, and the determined plurality of phase differences may be averaged to generate a frequency offset estimate.

The communication system may be compliant with a wireless standard, comprising UMTS EUTRA (LTE), WiMAX (IEEE 802.16), and/or WLAN (IEEE 802.11). The sub-sequences may all be of a same length. The phase differences may be computed by computing a phase difference between two sums, where each of the two sums may be formed from a contiguous set of the determined correlation coefficients, and the two contiguous sets may be mutually exclusive. The union of the two contiguous sets may comprise a contiguous set of the determined correlation coefficients. The averaging may be performed by forming a sample mean from the determined phase differences. An operable frequency offset range may be increased by increasing a number of the contiguous sample sub-sequences. The received sample sequence and the local replica sample sequence may be derived from a pseudo-random sequence. In some instances, the pseudo-random sequence may comprise complex sequence elements. The phase differences may be determined through linear approximation techniques.

Figure 1:
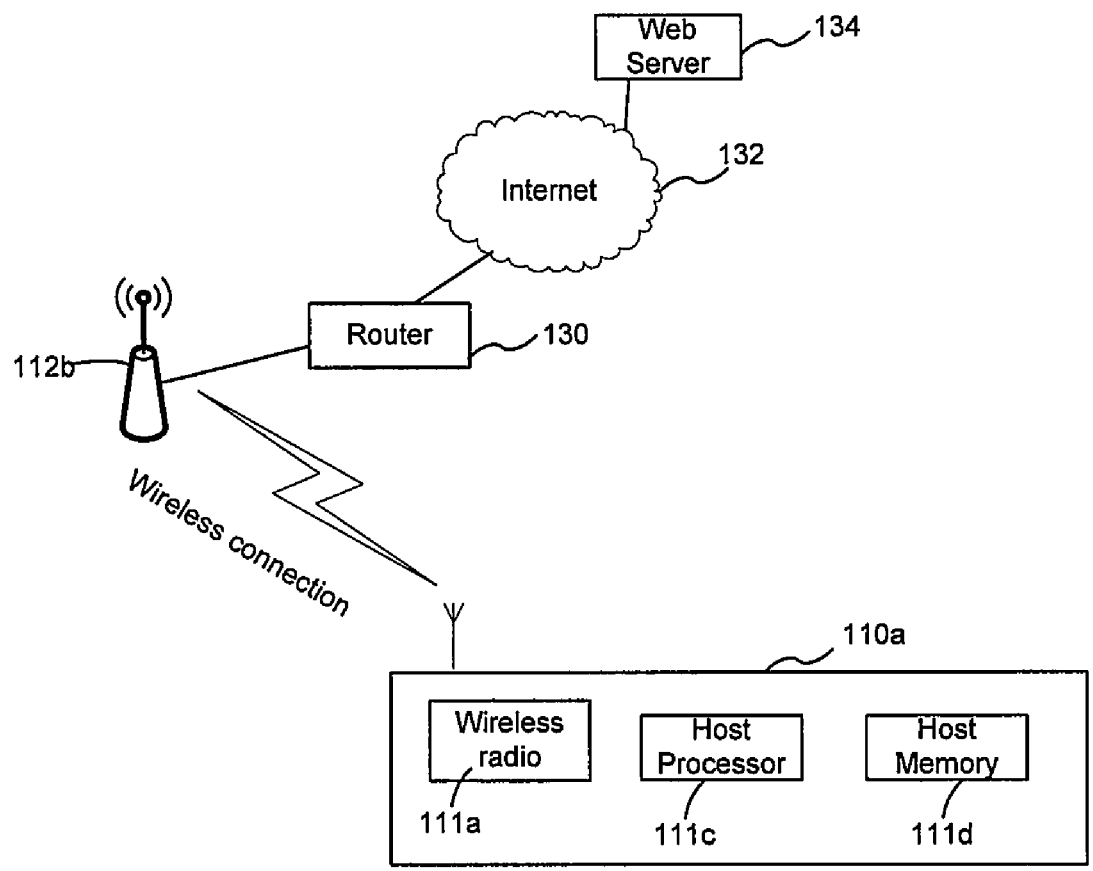
FIG. 1 is a diagram illustrating an exemplary wireless communication system, in accordance with an embodiment of the invention.

FIG. 1 is a diagram illustrating an exemplary wireless communication system, in accordance with an embodiment of the invention. Referring to FIG. 1, there is shown an access point 112b, a computer 110a, a router 130, the Internet 132 and a web server 134. The computer or host device 110a may comprise a wireless radio 111a, a host processor 111c, and a host memory 111d. There is also shown a wireless connection between the wireless radio 111a and the access point 112b.

The access point 112b may comprise suitable logic, circuitry and/or code that may be enabled to transmit and receive radio frequency (RF) signals for data communications, for example with the wireless radio 111a. The access point 112b may also be enabled to communicate via a wired network, for example, with the router 130. The wireless radio 111a may comprise suitable logic, circuitry and/or code that may enable communications over radio frequency waves with one or more other radio communication devices. The wireless radio 111a and the access point 112b may be compliant with one or more communication standards, for example, GSM, UMTS EUTRA (LTE), CDMA2000, Bluetooth, WiMAX (IEEE 802.16), and/or IEEE 802.11 Wireless LAN.

The host processor 111c may comprise suitable logic, circuitry and/or code that may be enabled to generate and process data. The host memory 111d may comprise suitable logic, circuitry and/or code that may be enabled to store and retrieve data for various system components and functions of the computer 110a.

The router 130 may comprise suitable logic, circuitry and/or code that may be enabled to communicate with communication devices that may be communicatively coupled to it, for example the access point 112b and/or one or more communication devices that may be communicatively coupled to the Internet 132.

The Internet 132 may comprise suitable logic, circuitry and/or code that may be enabled to interconnect and exchange data between a plurality of communication devices. The web server 134 may comprise suitable logic, circuitry and/or code that may be enabled to communicate with communication devices that may be communicatively coupled to it via, for example the Internet 132.

Various computing and communication devices comprising hardware and software may be enabled to communicate using one or more wireless communication standards and/or protocols. For example, a user of the computer or host device 110a may access the Internet 132 in order to consume streaming content from the Web server 134. Accordingly, the user may establish a wireless connection between the computer 110a and the access point 112b. Once this connection is established, the streaming content from the Web server 134 may be received via the router 130, the access point 112b, and the wireless connection, and consumed by the computer or host device 110a.

In many communication systems, it may be desirable to achieve synchronization between, for example, a receiver of wireless radio 111a and a transmitter in the access point 112b. Synchronization may be achieved by sending known sequences of data from a transmitter to a receiver. These data sequences may be referred to as pilot signals, synchronization signals and/or reference signals. By timing reception and measuring frequency offsets of such pilot, synchronization and/or reference signals, for example through correlation with a local signal replica, timing information and frequency offset information may be obtained. It may be desirable to employ a synchronization protocol that may be low-complexity, and may offer a large dynamic offset frequency range. In accordance with various embodiments of the invention, sub-sequences of the local signal replica may be correlated with sub-sequences of the received signal. A plurality of phase lags may be computed from pairs of correlation coefficients based on adjacent sub-sequence pairs. A frequency offset may be determined based on, for example, averaging a plurality of phase lags at one or more timing lags in a correlation process, where a peak in the correlation process magnitude may occur.

Figure 2:
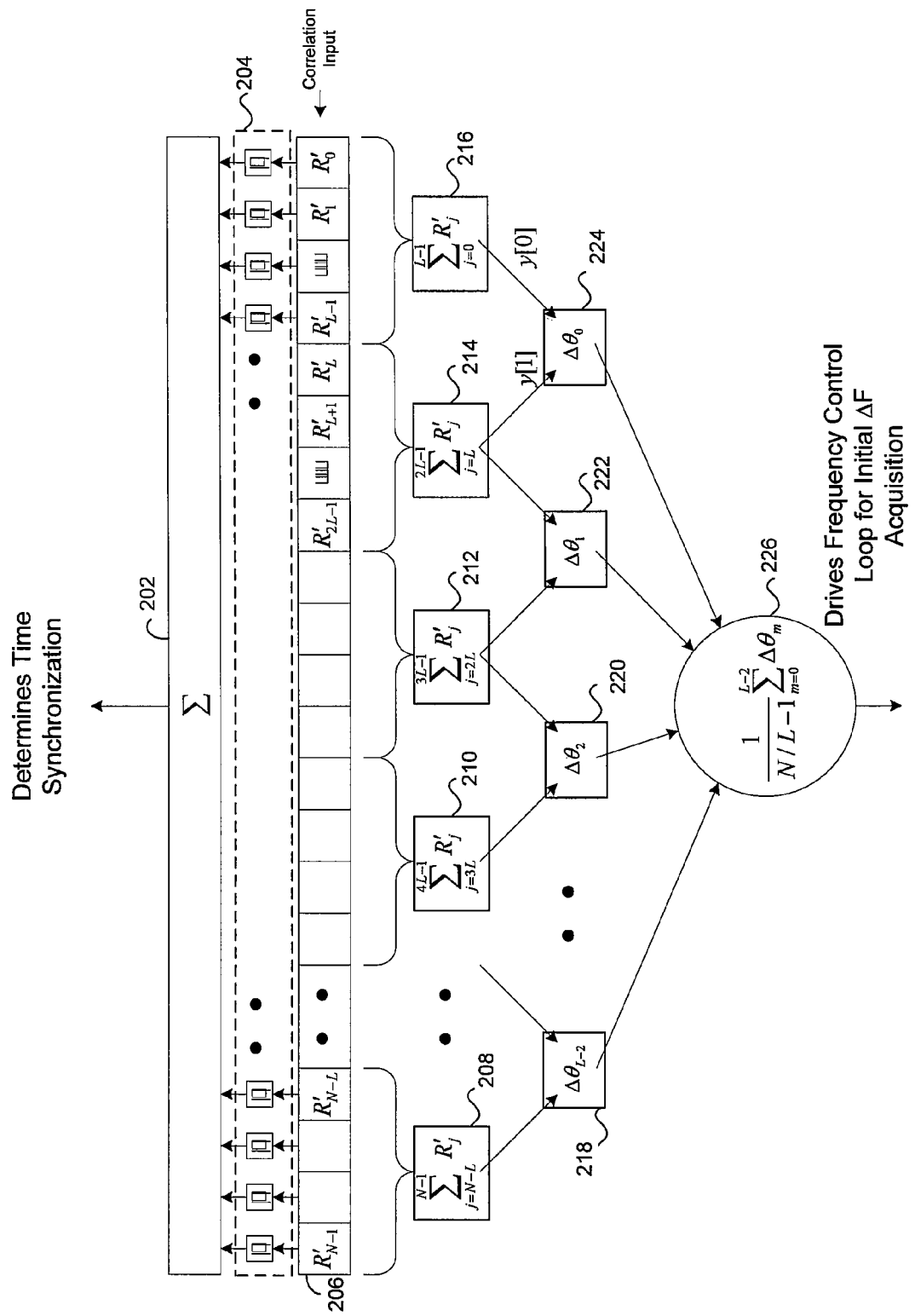
FIG. 2 is a diagram of an exemplary correlator for estimating frequency offset, in accordance with an embodiment of the invention.

FIG. 2 is a diagram of an exemplary correlator for estimating frequency offset, in accordance with an embodiment of the invention. Referring to FIG. 2, there is shown a plurality of adders 202, 208, 210, 212, 214, and 216, weighting block 204, memory 206, a plurality of phase discrimination blocks 218, 220, 222, and 224, and averaging block 226. There is also shown a correlation input, an output of adder 202 to, for example, time synchronization, and an output to averaging block 226 to a frequency control loop.

The adder 202 may comprise suitable logic, circuitry and/or code that may be enabled to generate an output signal that may be proportional to the sum of a plurality of input signals. The adders 208, 210, 212, 214, and 216 may be substantially similar to the adder 202.

The weighting block 204 may comprise suitable logic, circuitry and/or code that may be enabled to generate a plurality of weighted output signals. In this regard, each output signal may comprise one of a plurality of weighed input signals. Accordingly, the weighting block 204 may be operable to input signals.

The memory 206 may comprise suitable logic, circuitry and/or code that may be enabled to receive and store a plurality of correlation coefficients, for example N correlation coefficients. The correlation coefficients may be received, for example, from the wireless radio 111a, which may comprise a plurality of sub-sequence correlators. The plurality of sub-sequence correlators may be arranged to provide sub-correlation results that may be ordered contiguously for a full length reference or correlation sequence, for instance.

The phase discrimination block 218 may comprise suitable logic, circuitry and/or code that may be enabled to generate an output signal comprising a phase difference, that may be proportional to a frequency offset between a synchronization signal that may be received via a wireless radio link, and a local replica of a reference signal, for example. The phase discrimination blocks 220, 222, and 224 may be substantially similar to the phase discrimination block 218.

The averaging block 226 may comprise suitable logic, circuitry and/or code that may be enabled to generate an output signal that may be proportional to a sample mean of a plurality of input signals.

Complex random sequences and/or pilot signals may be enabled to assist synchronization acquisition in communication systems. These complex sequences may also be used to estimate a frequency offset, for example between a transmission carrier frequency at a base station, for example access point 112b, and a receiver local oscillator frequency at a mobile terminal, for example host 110a. Because of inaccuracies that may be associated with a crystal oscillator, manufacturing tolerances, and/or other factors, the mobile terminal receiver oscillator frequency may be offset with regard to the transmission carrier frequency at the base station transmitter. By performing oscillator frequency synchronization in the time and/or frequency synchronization process, the likelihood of the receiver successfully completing initial synchronization-related operations may be increased. Additionally, the ability to acquire frequency synchronization early in the signal acquisition process may permit successful synchronization to be achieved under difficult conditions, for example when the signal-to-noise ratio may be reduced.

For example, a complex synchronization sequence may comprise M complex valued elements. The complex sequence may be partitioned into, for example, two partial sequences. To acquire initial frequency offset estimation based on an autocorrelation of these partial sequences, two halves of a reference sequence may be correlated with the two partial sequences. From the two partial correlation results for each of the two sequence sections, a frequency offset may be estimated by computing the complex angular increment between the two partial correlation results.

In accordance with various embodiments of the invention, the operable frequency range over which frequency offsets may successfully be acquired and/or frequency synchronization achieved, may be extended by performing partial correlation over a plurality of partial complex sequences. Thus, the number of complex sequence sections/partitions may be increased to perform more partial correlations over a smaller number of sequence elements, and determining the angular increment between successive resultant partial correlation results. In accordance with various embodiments of the invention, this approach may extend the frequency offset range over which timing synchronization may be acquired.

A discrete complex valued sequence, s[n], of length M, may be transmitted as a timing reference sequence. At a receiver, for example a mobile terminal, where it may be desirable that synchronization with the transmitter be established, M samples from a received signal, r[n], may be correlated against a reference synchronization sequence s[n]. The correlation output may be given by the following relationship:

$$R_\tau = \sum_{j=0}^{M-1} r[j+\tau]s^*[j]$$

where $R_\tau$ may denote the correlation coefficient at an offset $\tau$, and * may denote complex conjugate. To establish a timing reference, for example the timing offset between the received sequence r[n] and a reference sequence s[n], it may be desirable to find $\max(|R_\tau|), \tau \geq 0$. In the presence of a receiver frequency offset, $f_o$, the received signal may be described by the following relationship:

$$r'[n]=r[n]e^{j2\pi f_o nT}$$

where r'[n] may denote the signal r[n] with an imparted frequency-offset.

In cases where there is a frequency offset, the correlation coefficients, $R_\tau$, may be distorted when compared to an ideal correlation function without frequency offset. Thus, a maximum in the correlation magnitude may appear in a different position when compared to a corresponding maximum in a case where there is no frequency offset. When this occurs, incorrect synchronization timing may be determined, and when these incorrect synchronization timings may be used for estimating frequency offset, suboptimal frequency offset estimates may be obtained.

In accordance with various embodiments of the invention, it may be desirable that correct timing synchronization may be established, especially under conditions of frequency offset. To increase the likelihood that the maximum in the magnitude of the correlation process may coincide with the correct synchronization timing, the overall correlation process may be broken down into several shorter correlation processes, and the resulting magnitudes may be combined.

For example, a complex valued discrete sequence, s[n]={s[0], s[1], . . . , s[M−1]} may be transmitted as a timing reference. Timing synchronization may be established through correlation. In this instance, instead of performing the correlation coherently over M samples as described above, the correlation of a received sequence and a locally generated replica reference sequence, may be sub-divided into N segments each comprising p elements, i.e. N=M/p. The local replica sample sub-sequences may be correlated with the received sample sub-sequences, to generate a sequence of correlation coefficients $R'_k$. The sequence $R'_k$, k=0, 1 . . . , N−1 may be stored in memory 206 for processing in the plurality of adders 208 through 216. The correlation magnitude may then be given according to the following relationship, for example:

$$|R_\tau| = \sum_{k=0}^{N-1} \left| \frac{\sum_{j=kp}^{(k+1)p-1} r[j+\tau]s^*[j]}{R'_k} \right|$$

L contiguous correlation coefficients, $R'_k$, may be summed by adders 208 to 216 to generate y[n], for example. For example, the adder 216 may generate y[0], and the adder 214 may generate y[1], as illustrated in FIG. 2.

In various embodiments of the invention, the N/L coherently established correlation results, y[k] may determine N/L−1 phase increments across the full correlation length, which may be M. However, depending on the frequency offset range required, the N/L correlation sub-sections may imply a sampling frequency too high relative to a desired offset range. This may render small angular increment estimates, which may adversely affect frequency control loop dynamics.

As illustrated in FIG. 2, the angular difference between two successive correlation results, for example y[n] and y[n+1], may be estimated from the following relationship, as illustrated in the exemplary phase discrimination blocks 218, 220, 222, and 224:

$$\Delta\theta_n = \arctan(Im(y[n+1]y^*[n])/Re(y[n+1]y^*[n])), n=0, 1, \ldots, N/L-1.$$

In some instances, the phase difference between y[n] and y[n+1] may be approximated, for example through linear approximation of arctan.

An average angular increment, $\Delta\hat{\theta}$, may be estimated from the N/L estimates, by the following relationship:

$$\Delta\hat{\theta} = \frac{1}{N/L-1} \sum_{m=0}^{N-1} \Delta\theta_m$$

where the N/L phase increments may be averaged in the averaging block 226 to deliver an average angular increment, which is related to the frequency offset.

In accordance with various embodiments of the invention, the sum of magnitudes of short coherent correlation sections may be desirable to establish correct timing, while longer coherent correlation sections may be desirable because angular increments may be estimated from them. This may allow frequency control dynamics which may be efficient, and may result in a large control range. To overcome these potentially conflicting criteria, both may be implemented together. The received signal may comprise a pseudo-random sequence.

Figure 3:
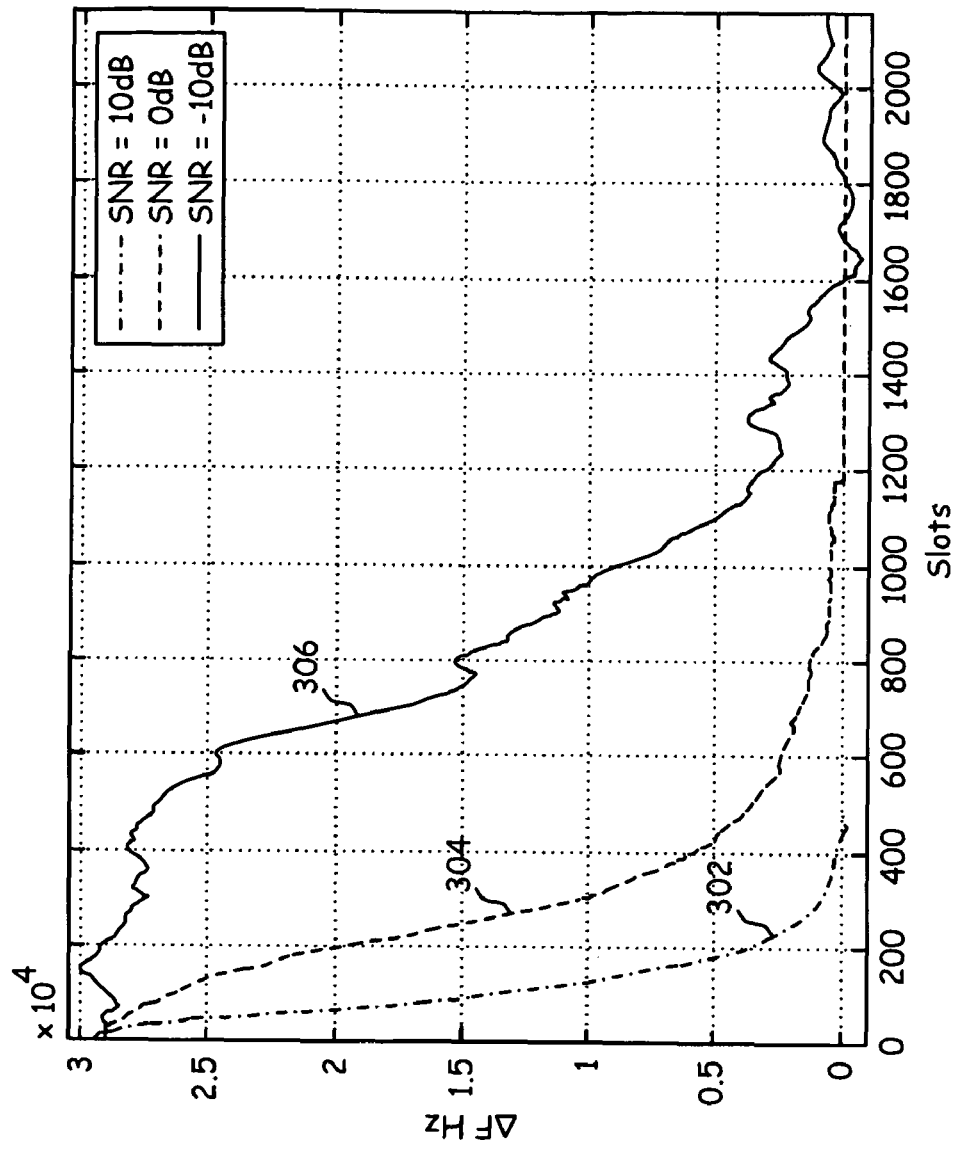
FIG. 3 is a plot of an exemplary EUTRA frequency acquisition characteristic under various SNR conditions, in accordance with an embodiment of the invention.

FIG. 3 is a plot of an exemplary EUTRA frequency acquisition characteristic under various SNR conditions, in accordance with an embodiment of the invention. There is shown a SNR 10 dB plot 302, a SNR 0 dB plot 304, and a SNR −10 dB plot 306. On the horizontal axis, a number of slots may be indicated. The vertical axis may indicate a frequency offset.

In accordance with an exemplary embodiment of the invention, a Primary Synchronization Signal (PSS) may be defined in the Enhanced Universal Terrestrial Radio Access (Long Term Evolution), E-UTRA(LTE), standard. The complex signal sequences specified may be Zadoff-Chu sequences, for example of length 63, with puncturing of a single central (middle) element from the sequences. These sequences may then be mapped, for example, to 32 sub-carriers on either side of the DC position. At the signal's fundamental rate, this may correspond to a time-domain sequence of length 63. However, to obtain desirable sampling properties for primary synchronization acquisition, for example frequency offset estimation and/or frequency offset range extension, or channel estimation for detecting the Secondary Synchronization Signal (SSS), the time-domain representation of the signal may be oversampled. An exemplary over-sampling factor may be two, which may generate a 128 sample replica of the primary synchronization signal, that is, the reference signal against which primary synchronization may be performed may comprise 128 complex elements. Within the numerology of the E-UTRA specification, this may signify a fundamental sampling rate of 1.92 MHz, for example.

In accordance with an embodiment of the invention, to successfully acquire the PSS when frequency offsets may exist of up to ±15 ppm or larger, with respect to a carrier frequency of, for example, 2 GHz, exemplary parameters for the synchronization scheme as described above are as shown in the table below:

| | |
|---|---|
| M | 128 |
| N | 16 |
| p | 8 |
| L | 4 |

By selecting the above parameters appropriately, the frequency offset acquisition ranges obtainable may be varied, which may require a trade-off between cost/benefit and reduced/improved primary synchronization, at higher/lower SNRs, respectively.

In accordance with various embodiments of the invention, a SNR 10 dB plot 302 may illustrate a fast convergence to a zero frequency offset. A SNR 0 dB plot 304 may illustrate a slower convergence, requiring a higher number of slots, to achieve a zero frequency offset. Correspondingly, a SNR −10 dB plot 306 may show the slowest convergence of the illustrated SNR plots 302, 304 and 306. Thus, frequency offset acquisition may be faster with higher SNR.

Figure 4:
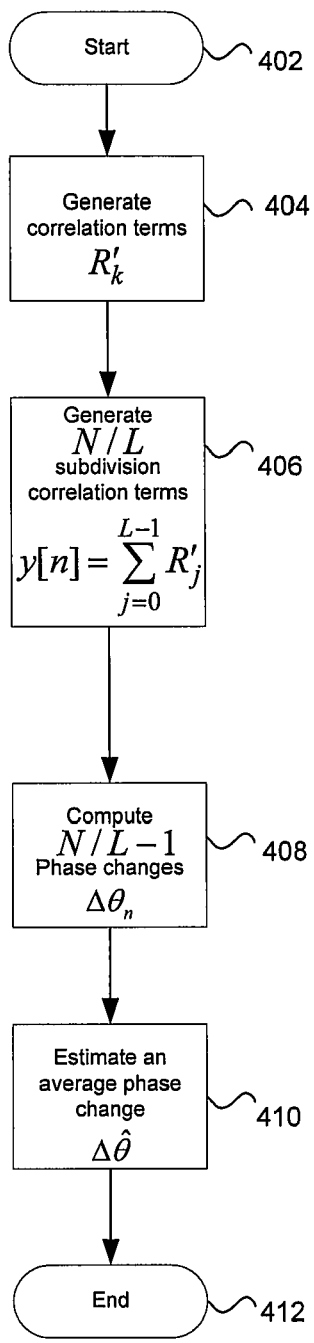
FIG. 4 is a flow chart illustrating an exemplary frequency offset estimation protocol, in accordance with an embodiment of the invention.

FIG. 4 is a flow chart illustrating an exemplary frequency offset estimation protocol, in accordance with an embodiment of the invention. After initialization in step 402, the correlation terms $R'_k$ may be generated in step 404, as described with respect to FIG. 2, from the received signal, for example. In step 406, the correlation terms $R'_k$ may be subdivided into N/L groups of p elements. For each group, the correlation coefficients $R'_k$ may be processed to generate the output signal set {y[n]} of the adders 208 through 216, for example. In step 408, the outputs of the adders may be processed to generate N/L−1 phase change terms, $\{\Delta\theta_n\}$, as described with respect to FIG. 2. By averaging the phase change terms, an angular increment estimate, $\Delta\hat{\theta}$, may be generated in step 410.

In accordance with various embodiments of the invention, in some cases, the sub-sequences that may result in the outputs {y[n]}, may be of arbitrary length, and the length may be determined for each output individually. In some instances, computing the phase change terms may comprise non-linear functions. In those instances, it may be desirable to employ a linear approximation to the phase change, for example a first order approximation. This may be particularly desirable for small phase change terms.

In accordance with an embodiment of the invention, a method and system for the extension of frequency offset estimation range based on correlation of complex sequences may comprise partitioning each of a received sample sequence r[n] and a local replica sample sequence s*[n] into three or more similar length contiguous sample sub-sequences, as described with respect to FIG. 2. For each of the three or more similar length contiguous sample sub-sequences, a correlation coefficient, y[n], may be determined between corresponding sample sub-sequences of the partitioned received sample sequence and the local replica sample sequence. A plurality of phase differences may be determined, for example $\Delta\theta_i$, based on adjacent ones of the determined correlation coefficients, and the determined plurality of phase differences may be averaged to generate a frequency offset estimate $\Delta\hat{\theta}_i$, as described with respect to FIG. 2.

The communication system may be compliant with a wireless standard, comprising UMTS EUTRA (LTE), WiMAX (IEEE 802.16), and/or WLAN (IEEE 802.11). The sub-sequences may all be of a same length, for example. The phase differences may be computed by computing a phase difference between two sums, where each of the two sums may be formed from a contiguous set of the determined correlation coefficients, and the two contiguous sets may be mutually exclusive. For example, the sums may be $$\sum_{j=0}^{L-1} R'_j \text{ and } \sum_{j=L}^{2L-1} R'_j,$$

and may generate a phase difference $\Delta\theta_0$, as illustrated in FIG. 2. The union of the two contiguous sets may comprise a contiguous set of the determined correlation coefficients, for example $\{R'_0, \ldots, R'_{2L-1}\}$.

The averaging, for example in averaging block 226, may be performed by forming a sample mean from the determined phase differences $\Delta\theta_i$. An operable frequency offset range may be increased by increasing a number of the contiguous sample sub-sequences, as described for FIG. 2. The received sample sequence and the local replica sample sequence may be derived from a pseudo-random sequence. In some instances, the pseudo-random sequence may comprise complex sequence elements. The phase differences may be determined through linear approximation techniques, as described for FIG. 2 and FIG. 4.

Another embodiment of the invention may provide a machine-readable and/or computer-readable storage and/or medium, having stored thereon, a machine code and/or a computer program having at least one code section executable by a machine and/or a computer, thereby causing the machine and/or computer to perform the steps as described herein for a method and system for the extension of frequency offset estimation range based on correlation of complex sequences.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals, the method comprising:
  in a wireless communication device:
    partitioning each of a received sample sequence and a local replica sample sequence into four or more similar length contiguous sample sub-sequences;
    for each of said four or more similar length contiguous sample sub-sequences, determining a correlation coefficient between corresponding sample sub-sequences of said partitioned received sample sequence and said local replica sample sequence;
    determining a plurality of phase differences between adjacent contiguous sets of said determined correlation coefficients, wherein each of said contiguous sets of said determined correlation coefficients is coherently established utilizing at least two contiguous ones of said determined correlation coefficients; and
    averaging said determined plurality of phase differences to generate a frequency offset estimate.

2. The method according to claim 1, wherein said communication system is compliant with a wireless standard.

3. The method according to claim 2, wherein said wireless standard comprises UMTS EUTRA (LTE), WiMAX (IEEE 802.16), and/or WLAN (IEEE 802.11).

4. The method according to claim 1, wherein said sub-sequences are all of a same length.

5. The method according to claim 1, comprising computing said plurality of phase differences by computing a phase difference between two sums, where each of said two sums is formed from a contiguous set of said determined correlation coefficients, and said two contiguous sets are mutually exclusive.

6. The method according to claim 5, wherein a union of said two contiguous sets comprises a contiguous set of said determined correlation coefficients.

7. The method according to claim 1, comprising for said averaging, generating a sample mean from said determined phase differences.

8. The method according to claim 1, comprising increasing a frequency offset estimation range by increasing a number of said contiguous sample sub-sequences.

9. The method according to claim 1, wherein said received sample sequence and said local replica sample sequence are derived from a pseudo-random sequence.

10. The method according to claim 1, comprising determining said phase differences through approximation.

11. A system for processing communication signals, the system comprising:
  one or more circuits, said one or more circuits enabled to:
    partition each of a received sample sequence and a local replica sample sequence into four or more similar length contiguous sample sub-sequences;
    for each of said four or more similar length contiguous sample sub-sequences, determine a correlation coefficient between corresponding sample sub-sequences of said partitioned received sample sequence and said local replica sample sequence;
    determine a plurality of phase differences between adjacent contiguous sets of said determined correlation coefficients, wherein each of said contiguous sets of said determined correlation coefficients is coherently established utilizing at least two contiguous ones of said determined correlation coefficients; and
    average said determined plurality of phase differences to generate a frequency offset estimate.

12. The system according to claim 11, wherein said communication system is compliant with a wireless standard.

13. The system according to claim 12, wherein said wireless standard comprises UMTS EUTRA (LTE), WiMAX (IEEE 802.16), and/or WLAN (IEEE 802.11).

14. The system according to claim 11, wherein said sub-sequences are all of a same length.

15. The system according to claim 11, wherein said one or more circuits computes said plurality of phase differences by computing a phase difference between two sums, where each of said two sums is formed from a contiguous set of said determined correlation coefficients, and said two contiguous sets are mutually exclusive.

16. The system according to claim 15, wherein a union of said two contiguous sets comprises a contiguous set of said determined correlation coefficients.

17. The system according to claim 11, wherein said one or more circuits generates a sample mean from said determined phase differences, for said averaging.

18. The system according to claim 11, wherein said one or more circuits increase a frequency offset estimation range by increasing a number of said contiguous sample sub-sequences.

19. The system according to claim 11, wherein said received sample sequence and said local replica sample sequence are derived from a pseudo-random sequence.

20. The system according to claim 11, wherein said one or more circuits determine said phase differences through approximation.

* * * * *